United States Patent

Uenishi et al.

[11] Patent Number: 5,241,413
[45] Date of Patent: Aug. 31, 1993

[54] WAVELENGTH CONVERTER

[75] Inventors: Naota Uenishi; Takafumi Uemiya, both of Osaka, Japan

[73] Assignee: Sumitomo Electric Industries, Ltd., Osaka, Japan

[21] Appl. No.: 828,693

[22] Filed: Jan. 31, 1992

[30] Foreign Application Priority Data

Feb. 1, 1991 [JP] Japan .................................. 3-11851

[51] Int. Cl.$^5$ .............................................. H03F 7/00
[52] U.S. Cl. ........................................ 359/328; 372/22
[58] Field of Search ............................ 372/21, 22, 23; 359/326, 328, 329, 330, 331

[56] References Cited

U.S. PATENT DOCUMENTS

| | | | |
|---|---|---|---|
| 3,384,433 | 5/1968 | Bloembergen | 359/328 |
| 3,842,289 | 10/1974 | Yariv et al. | 359/332 |
| 4,865,406 | 9/1989 | Khanarian et al. | 359/332 |
| 5,058,970 | 10/1991 | Schildkraut et al. | 359/328 |
| 5,121,250 | 6/1992 | Shinozaki et al. | 359/328 |
| 5,128,948 | 7/1992 | Papuchon et al. | 372/21 |
| 5,138,686 | 8/1992 | Chikuma et al. | 385/122 |
| 5,150,446 | 9/1992 | Penner et al. | 385/122 |

FOREIGN PATENT DOCUMENTS 9109339 6/1991 PCT Int'l Appl. .

*Primary Examiner*—Frank Gonzalez
*Attorney, Agent, or Firm*—Cushman, Darby & Cushman

[57] ABSTRACT

In a wavelength converter, nonlinear medium layers containing material having an increased second order susceptibility, and linear medium layers, not containing material having a nonlinear optical characteristic of the second degree, are alternatively layered. A fundamental wave (of which the angular frequency is $\omega$) is incident on the multi-layered structure in a direction normal to the major surfaces of the nonlinear medium layers and the linear medium layers, thereby generating the second harmonic of the fundamental wave (of which the angular frequency is $2\omega$). The thickness of each of the linear and nonlinear medium layers is selected to be an odd-number times as long as the coherence length. The wavelength can be converted utilizing the diagonal element $d_{ii}$ of the second degree, nonlinear optical tensor.

5 Claims, 2 Drawing Sheets

WAVELENGTH CONVERTER

BACKGROUND OF THE INVENTION

1. Field of the Invention

The present invention relates to a wavelength converter which receives laser light of the fundamental wave from a semiconductor laser, and produces the second harmonic of the fundamental wave in the form of wavelength-converted light.

2. Discussion of the Prior Art

A wavelength converter is known which receives the fundamental wave of laser light and produces the second harmonic as wavelength-converted light of the halved wavelength. There are two types of wavelength converters, a bulk crystal type element and a waveguide type element. The wave-guide type includes wavelength converters of the optical fiber type and the channel type.

The bulk crystal type wavelength converter is easier to handle than the wave-guide type wavelength converter because it is easy to direct laser beams to the wavelength converter, and a beam pattern of the generated second harmonic is the same as that of the incident laser beams.

The bulk crystal type wavelength converter will be described in more detail. A fundamental wave of the angular frequency $\omega$ is applied to the end face 2 of a bulk crystal wavelength converter 1 as shown in FIG. 2 (PRIOR ART). An electric field $E_{2w}$ of the generated second harmonic (angular frequency $2\omega$) is $$E_{2w} \propto d \int_0^L e^{i\Delta kz} dz \tag{1}$$

In formula (1), z indicates the linear coordinate in the incident direction of the fundamental wave, "d" indicates the nonlinear optical coefficient of the second degree and $\Delta k$ is given by $$\Delta k = k_{2w} - 2k_w = \frac{4\pi(n_{2w} - n_w)}{\lambda} \tag{2}$$

$k_w$ = number of waves of the fundamental wave
$k_{2w}$ = number of waves of the second harmonic
$n_w$ = refractive index of the crystal to the fundamental wave
$n_{2w}$ = refractive index of the crystal to the second harmonic
$\lambda$ = wavelength of the fundamental wave. From the formulas (1) and (2), we have $$E_{2w} \propto \frac{d}{i\Delta k}(e^{i\Delta kL} - 1) \tag{3}$$

Then, an intensity $P_{2w}$ of the second harmonic is $$P_{2w} \propto E_{2w} \cdot E_{2w}^* = \frac{d^2 L^2 \sin^2(\Delta kL/2)}{(\Delta kL/2)^2} \tag{4}$$

(where $E_{2w}^*$ is the complex conjugate of the electric field $E_{2w}$). Where $\Delta k \neq 0$, that is, when $$n_{2w} \neq n_w \tag{5}$$

which is derived from formula (2), the intensity $P_{2w}$ of the second harmonic periodically varies with respect to the z coordinate position, as indicated by a curve A1 in FIG. 3. The ½ period Lc of the intensity variation is defined as a coherent length and mathematically expressed by the following formula $$Lc = \frac{\lambda}{4|n_{2w} - n_w|} \tag{6}$$

When $\Delta k = 0$, that is, when, $$n_{2w} = n_w \tag{7}$$

which is derived from formula (2), we see that an intensity $P_{2w}$ of the second harmonic, from formula (4), is $$P_{2w} \propto d^2 L^2 \tag{8}$$

This indicates that the intensity of the second harmonic increases proportionally to the square of the crystal length L, as indicated by a curve A2 in FIG. 3. The physical state is called a phase matching. An intensity $P_{2w}$ of the second harmonic, which is generated in the state of the phase matching, is given by $$P_{2w} = 8\pi^2 \sqrt{\frac{\mu_0}{\epsilon_0}} \cdot \frac{d^2}{n_w^2 n_{2w}} \cdot \left(\frac{L}{\lambda}\right)^2 \cdot \frac{P_w^2}{\pi w_0^2} \tag{9}$$

where
$\mu_0$ = magnetic permeability of vacuum
$\epsilon_0$ = dielectric constant of vacuum
$P_w$ = intensity of the fundamental wave
$w_0$ = beam radius of the fundamental wave To realize the phase matching, in the bulk crystal type wavelength converter, the crystal is sliced in a specific orientation by utilizing the optical anisotropy of the crystal the physical property of the crystal where the refractive index differs in different orientations when measured along the axes.

Thus, in the bulk crystal type wavelength converter, the phase matching is realized by utilizing the optical anisotropy of the crystal. Therefore, only the nondiagonal element $d_{ij}$ (i≠j) of the nonlinear optical tensor is allowed to be used for the nonlinear optical coefficient "d" of second degree. Hence, the wavelength converting efficiency is low. Generally, the maximum element of the nonlinear optical tensor is frequently the diagonal element $d_{ii}$. This diagonal element cannot be utilized in the bulk crystal type wavelength converter, however. Additionally, in the phase matching state, the non-diagonal element $d_{ij}$ cannot be fully utilized, hence a great increase in the wavelength converting efficiency cannot be expected.

A specific type of the bulk crystal type wavelength converter is the domain inverting type wavelength converter, as shown in FIG. 4 (PRIOR ART). This type of wavelength converter includes a diagonal element $d_{ii}$ of the nonlinear optical tensor, and may be utilized in the bulk crystal type wavelength converter. As shown, the domains 11 are layered alternately, inverting the directions (denoted as P) of the nonlinear optical coefficients "d". The thickness of each domain 11 is an odd number times as long as the coherent length Lc, i.e., mLc (m = odd number).

As described above, in a state that $n_{2w} \neq n_w$, where the phase matching is not realized, the intensity $P_{2w}$ of the second harmonic periodically varies. The periodical variation of the intensity is due to the fact that the phase difference of $2\pi$ is present between the electric field $E_{2w}(z)$ generated at the coordinate position "z" on the linear coordinate, which lies in the incident direction of the fundamental wave, and the electric field $E_{2w}(z+Lc)$ generated at the coordinate position "(z+Lc)". Accordingly, the electric fields $E_{2w}$ cancel each other (particularly at the coordinate positions z=2Lc, 4Lc, the electric fields completely cancel each other).

If the electric field $E_{2w}$ of the second harmonic generated in the segment [z+Lc, z+2Lc] is inverted by $\pi$, the electric fields $E_{2w}(z)$ and $E_{2w}(z+Lc)$ do not cancel each other, and the intensity $P_{2w}$ of the second harmonic progressively increases. The $\pi$ phase inversion of the electric field $E_{2w}$ may be realized by inverting the sign of the nonlinear optical coefficient "d". Eventually, this indicates that the domains 11, each having a thickness which is an odd number times as long as the coherence length Lc, are layered in such a way that the directions of the nonlinear optical coefficients "d" of the domains are alternately inverted, as shown FIG. 4. If $$N = \frac{L}{mLc} \tag{10}$$

the electric field $E_{2w}$, which is generated in the domain inverting type wavelength converter of length L, is:

$$E_{2w} \simeq d \int_0^{mLc} e^{i\Delta kz} dz - d \int_{mLc}^{2mLc} e^{i\Delta kz} dz + \tag{11}$$

$$d \int_{2mLc}^{3mLc} e^{i\Delta kz} dz - \ldots + (-1)^{N-1} d \int_{(N-1)mLc}^{NmLc} e^{i\Delta kz} dz$$

$$= \frac{d}{i\Delta k} \{(e^{i\Delta kmLc} - 1) - (e^{2i\Delta kmLc} - e^{i\Delta kmLc}) +$$

$$(e^{3i\Delta kmLc} - e^{2i\Delta kmLc}) - \ldots + (-1)^{N-1}(e^{Ni\Delta kmLc} - e^{(N-1)i\Delta kmLc})\}$$

$$= \frac{d}{i\Delta k} (e^{i\Delta kmLc} - 1) \{1 - e^{i\Delta kmLc} + e^{2i\Delta kmLc} - e^{3i\Delta kmLc} + \ldots + (-1)^{N-1}(e^{(N-1)i\Delta kmLc})\}$$

From formulas (2) and (6), we see that $$Lc = \pi/\Delta k. \tag{12}$$

Since "m" is an odd number, $$E_{2w} \propto \frac{d}{i\Delta k} (-1-1)(1+1+1+\ldots+1) = \tag{13}$$

$$N \text{ terms}$$

$$-\frac{2d}{i\Delta k} N$$

Substituting formulas (10) and (12) into the above formula, we get $$E_{2w} \simeq -\frac{1}{i} \cdot 2d \cdot \frac{Lc}{\pi} \cdot \frac{L}{mLc} = -\frac{1}{i} \cdot \frac{2d}{m\pi} \cdot L \tag{14}$$

Therefore, an intensity $P_{2w}$ of the second harmonic is given by $$P_{2w} \propto E_{2w} \cdot E_{2w}^* = \left(\frac{2d}{m\pi}\right)^2 \cdot L^2 \tag{15}$$

When comparing formulas (15) and (8), if $$d \to \frac{2d}{m\pi} \tag{16}$$

it is seen that both formulas are exactly equal to each other. This implies that even if the phase matching condition according to formula (7) is not satisfied, the domain inverting type wavelength converter, as shown in FIG. 4, is able to generate the second harmonic, as the bulk crystal type wavelength converter does when the phase matching condition is satisfied. This is called a quasiphase matching. Since the optical anisotropy of the crystal is not utilized, a high efficiency wavelength conversion can be realized by utilizing the diagonal element $d_{ii}$ of the second degree, nonlinear optical tensor. An intensity $P_{2w}$ of the second harmonic in the domain inverting type wavelength converter is expressed by $$P_{2w} = 8\pi^2 \sqrt{\frac{\mu_0}{\epsilon_0}} \cdot \frac{1}{n_w^2 n_{2w}} \cdot \left(\frac{2d}{m\pi}\right)^2 \cdot \left(\frac{L}{\lambda}\right)^2 \cdot \frac{P_w^2}{\pi w_0^2} \tag{17}$$

However, an excessive increase in the thickness of domain 11 results in a great attenuation of the second harmonic, limiting the wavelength converting efficiency. Therefore, the thickness of the domain 11 must be set to be about several $\mu$m. It is very difficult to manufacture thin films of such thickness and to layer them in a manner that the directions of the nonlinear optical coefficient "d" are alternately inverted. Only several examples of the domain inverting type bulk crystal wavelength converter actually manufactured have thus far been reported. The number of the layers of those examples ranges only from several to twenty. Therefore, the wavelength converting efficiency is unsatisfactory. The wavelength converter, which utilizes the diagonal element $d_{ii}$ of the second degree, nonlinear optical tensor, has not yet been put into practice. Thus, it is very difficult to realize a bulky wavelength converter with high wavelength converting efficiency.

SUMMARY OF THE INVENTION

Accordingly, an object of the present invention is to solve the technical problems stated above and to provide a wavelength converter which is remarkably improved in its wavelength converting efficiency, and may be manufactured in an easy manner.

The wavelength converter of the present invention comprises:

nonlinear medium layers of which the thickness is an odd-number times as long as a coherence length, the coherence length being one half the period of an intensity variation, the nonlinear medium layers containing material having a nonlinear optical characteristic of the second degree; and linear medium layers of which the thickness is an odd-number times as long as the coherence length, the linear medium layers not containing material causing a nonlinear optical characteristic of the second degree.

The nonlinear medium layers and the linear medium layers are alternately layered, forming a multi-layered structure.

Thus, a fundamental wave incident on the multi-layered structure in a direction normal to the major surfaces of the nonlinear medium layers and the linear medium layers, passes through the structure, and exits the structure as a second harmonic of the fundamental wave.

DETAILED DESCRIPTION OF THE PREFERRED EMBODIMENTS

Figure 1:
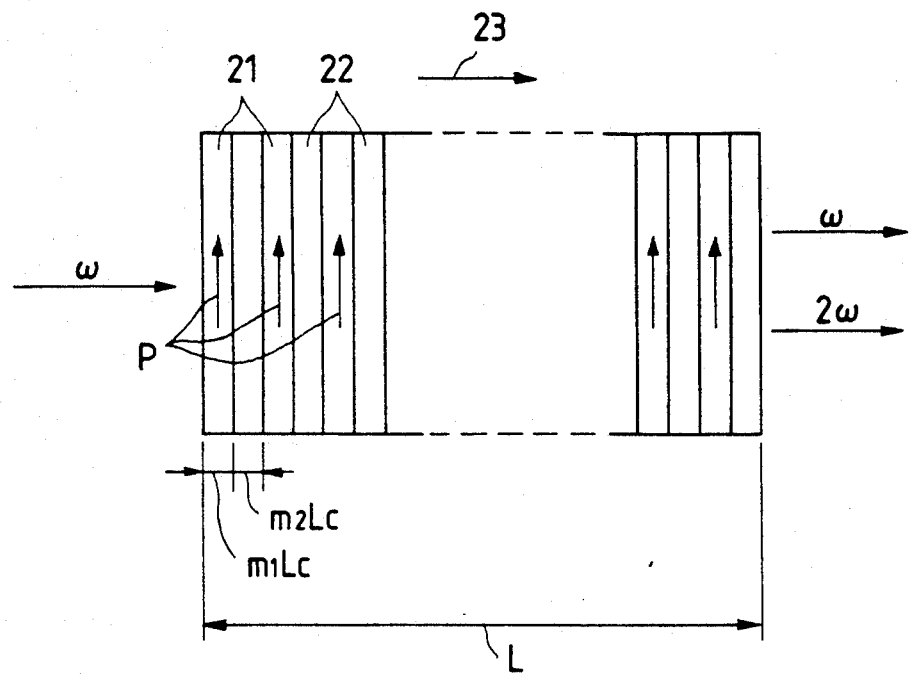
FIG. 1 is a schematic diagram showing the basic construction of a wavelength converter according to the present invention.
Figure 2:
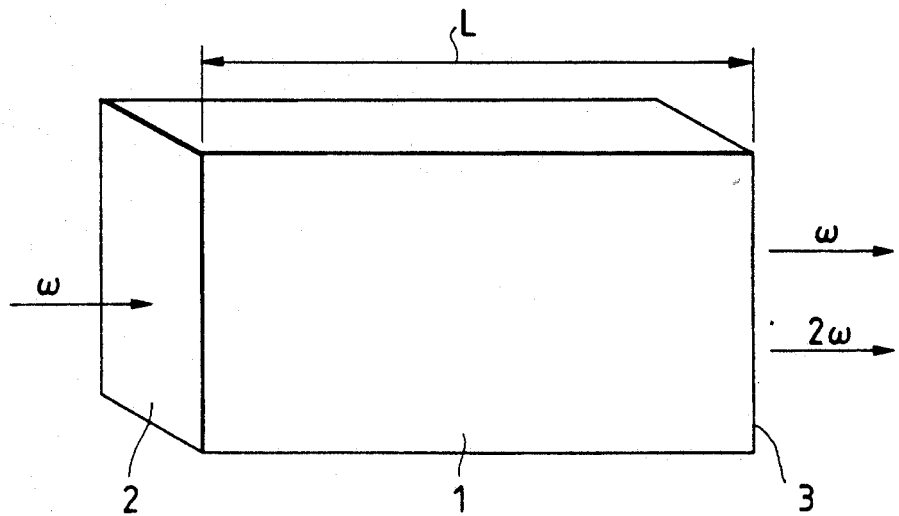
FIG. 2, (PRIOR ART) is a schematic diagram showing the basic construction of a bulk crystal type wavelength converter.
Figure 3:
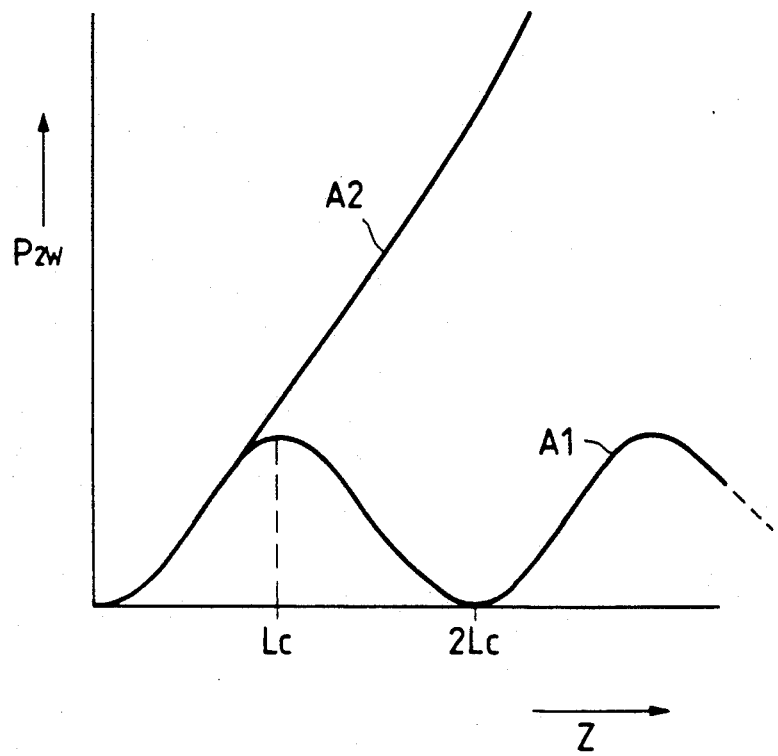
FIG. 3 is a graphical representation of a relationship between the intensity of the second harmonic vs. coordinate position.

The wavelength converter of the present invention, shown in FIG. 1, comprises: nonlinear medium layers 21 containing material having a nonlinear optical characteristic of the second degree; and linear medium layers 22 not containing material having a nonlinear optical characteristic of the second degree; wherein the nonlinear medium layers 21 and the linear medium layers 22 are alternatively layered, and a fundamental wave (of which the angular frequency is $\omega$) is incident on the multi-layered structure consisting of the nonlinear medium layers 21 and the linear medium layers 22 in a direction normal to the major surfaces of the nonlinear medium layers 21 and the linear medium layers 22, thereby generating the second harmonic of the fundamental value (of which the angular frequency is $2\omega$). The thickness of each of the linear and nonlinear medium layers 21 and 22 is selected to be an odd-number times as long as the coherence length Lc.

In the wavelength converter, refractive indexes of the nonlinear and linear medium layers to the fundamental wave and the second harmonic are preferably equal to each other.

Further, the nonlinear optical coefficients of the plurality of nonlinear medium layers are preferably oriented in a fixed direction (denoted as P). In the linear medium layers 22, the linear optical characteristic may be achieved using optical glass, transparent high polymer or the like.

Let us consider a case where the thickness of each of the plurality of nonlinear medium layers 21 is $m_1 Lc$, and the thickness of each of the linear medium layers 22 is $m_2 Lc$. In this case, $m_1$ and $m_2$ are each an odd-number, and Lc is the coherence length expressed by the formula (6). If the length L of the wavelength converter is expressed by $$N(m_1 Lc + m_2 Lc) = L \tag{18}$$

where N is a natural number, then the electric field $E_{2w}$ of the second harmonic generated is given by $$E_{2w} \propto d \int_0^{m_1 Lc} e^{i\Delta k z} dz + d \int_{m_1 Lc}^{2m_1 Lc + m_2 Lc} e^{i\Delta k z} dz + \tag{19}$$

$$d \int_{2m_1 Lc + 2m_2 Lc}^{3m_1 Lc + 2m_2 Lc} e^{i\Delta k z} dz + \ldots +$$

$$d \int_{(N-1)(m_1 Lc + m_2 Lc)}^{Nm_1 Lc + (N-1)m_2 Lc} e^{i\Delta k z} dz$$

$$= \frac{d}{i\Delta k} \{ (e^{i\Delta k m_1 Lc} - 1) - (e^{i\Delta k(2m_1+m_2)Lc} - e^{i\Delta k(m_1+m_2)Lc}) +$$

$$(e^{i\Delta k(3m_1+2m_2)Lc} - e^{i\Delta k(2m_1+2m_2)Lc}) + \ldots +$$

$$(e^{i\Delta k(Nm_1+(N-1)m_2)Lc} - e^{i\Delta k((N-1)m_1+(N-1)m_2)Lc}) \}$$

$$= \frac{d}{i\Delta k} (e^{i\Delta k m_1 Lc} - 1) \{ 1 + e^{i\Delta k(m_1+m_2)Lc} + e^{2i\Delta k(m_1+m_2)Lc} +$$

$$\ldots + e^{(N-1)i\Delta k(m_1+m_2)Lc} \}$$

From formulas (12) and (18), and the following formula $$m_1 + m_2 = (\text{even number}) \tag{20}$$

we get $$E_{2w} \propto \frac{d}{i\Delta k} (-1 - 1) \underbrace{(1 + 1 + 1 + \ldots + 1)}_{N \text{ terms}} \tag{21}$$

$$= -\frac{2d}{i\Delta k} N$$

$$= -\frac{1}{i} \cdot 2d \cdot \frac{Lc}{\pi} \cdot \frac{L}{(m_1 + m_2)Lc}$$

$$= -\frac{1}{i} \cdot \frac{2d}{(m_1 + m_2)\pi} \cdot L$$

An intensity $P_{2w}$ of the second harmonic is $$P_{2w} \propto \left\{ \frac{2d}{(m_1 + m_2)\pi} \right\}^2 \cdot L^2 \tag{22}$$

When comparing formula (22) and formula (8), if $$d \rightarrow \frac{2d}{(m_1 + m_2)\pi} \tag{23}$$

both formulas are exactly equal to each other. This implies that in the wavelength converter of the invention, quasi-phase matching can be realized, as in the domain inverting type wavelength converter already described.

An intensity $P_{2w}$ of the second harmonic of the wavelength converter constructed as mentioned above is given by the following formula $$P_{2w} = 8\pi^2 \sqrt{\frac{\mu_0}{\epsilon_0}} \cdot \frac{1}{n_w^2 n_{2w}} \cdot \tag{24}$$

$$\left\{ \frac{2d}{(m_1 + m_2)\pi} \right\}^2 \cdot \left( \frac{L}{\lambda} \right)^2 \cdot \frac{P_w^2}{\pi w_0^2}$$

Figure 4:
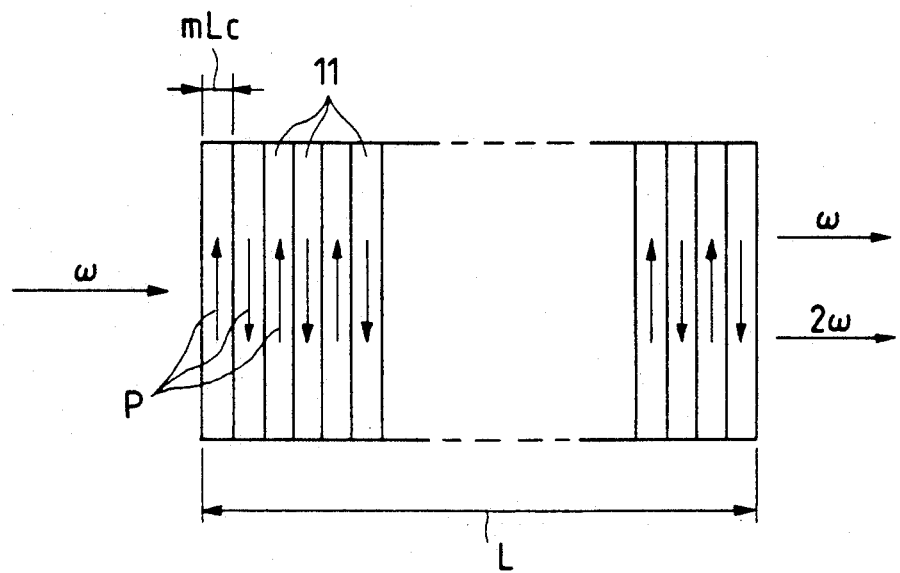
FIG. 4 (PRIOR ART) is a schematic diagram showing the basic construction of a domain inverting type wavelength converter.

The intensity $P_{2w'}$ of the second harmonic is slightly smaller than the intensity $P_{2w}$ of the second harmonic formula (17), that is generated by the domain inverting type wavelength converter shown in FIG. 4. However, the wavelength converting efficiency of the wavelength converter of the invention is remarkably higher than that of the conventional bulk crystal type wavelength converter. In the wavelength converter, the phase matching state can be set up by utilizing the diagonal element $d_{ii}$ of the nonlinear optical tensor.

From the comparison of formulas (9) and (24), it will be presumed that the wavelength converting efficiency of the wavelength converter of the invention is substantially equal to or lower than that of the bulk crystal type wavelength converter, so long as both the converters are made of the same material and use the same nondiagonal element $d_{ij}$. However, the diagonal element $d_{ii}$ may be used in the present invention. Therefore, the wavelength converting efficiency achieved by the wavelength converter of the present invention is considerably higher than that of the conventional bulk crystal wavelength converter.

The ratio of the wavelength converting efficiency of the wavelength converter of the present invention to that of the conventional one is, if $m_1 = m_2 = 1$, $$\frac{\left(\begin{array}{c}\text{wavelength converting}\\ \text{efficiency of the invention}\end{array}\right)}{\left(\begin{array}{c}\text{wavelength converting}\\ \text{efficiency of the}\\ \text{conventional converter}\end{array}\right)} = \left\{\frac{d(\text{invention})}{\pi} \cdot \frac{1}{d\left(\begin{array}{c}\text{bulk type}\\ \text{converter}\end{array}\right)}\right\}^2 \quad (25)$$

By Substituting 240 pm/V of the diagonal element $d_{11}$ of the second degree, nonlinear optical tensor of 2-methyl-4-nitroaniline into the term "d(invention)," and 0.5 pm/V of the nondiagonal element $d_{31}$ of the second degree, nonlinear optical tensor of the KDP (kaliumdihydrogenphosphat, potassium dyhydrogen phosphate) into the term "d(bulk type converter)", we get $$\frac{\left(\begin{array}{c}\text{wavelength converting}\\ \text{efficiency of the invention}\end{array}\right)}{\left(\begin{array}{c}\text{wavelength converting efficiency}\\ \text{of the conventional converter}\end{array}\right)} \sim 10000$$

The figure shows that according to the present invention, a bulk crystal wavelength converter can be manufactured having a remarkably improved wavelength converting efficiency.

Further, there is no need for alternately inverting the directions of the nonlinear optical coefficients of the thin films of the nonlinear medium when the films are layered, although the directions must be alternated in the domain inverting type wavelength converter. Therefore, the wavelength converter can be manufactured in a very easy manner.

In the wavelength converter, if refractive indexes of the nonlinear and linear medium layers to the fundamental wave and the second harmonic are equal to each other, no light is reflected at the interface therebetween. Accordingly, the wavelength will not have any attenuation of the fundamental wave and the second harmonic.

Further, the nonlinear optical coefficients of the plurality of nonlinear medium layers 21 are preferably oriented in the same direction. The reason for this is that if the nonlinear medium layers 21 are oriented in different directions, the refractive indexes change thereby, increasing the attenuation of the fundamental wave and the second harmonic.

The description above has been made under the assumption that the nonlinear medium layers 21 have the same thickness, and the linear medium layers 22 also have the same thickness. But as long as the thickness of each of the layers 21 and 22 is an odd number times as long as the coherence length, the combination of those layers nonuniform in thickness is allowed. The maximum wavelength converting efficiency can be achieved only when the thickness of each of the nonlinear and linear medium layers 21 and 22 is equal to the coherence length Lc.

Some examples are discussed below:

EXAMPLE 1

100 glass plates each of 1.3 μm, which exhibit 1.73 of the refractive index for light of wavelength 1.30 μm and 1.98 for light of wavelength of 0.650 μm, and spacers of 1.3 μm, were alternately layered. Melted 2-methyl-4-nitroaniline was sucked into the gap between the adjacent glass plates, and monocrystalline of the material was grown in the gap by the Bridgman method, to form a wavelength converter constructed as shown in FIG. 1.

A laser beam of wavelength 1.30 μm emitted from a semiconductor laser device was incident on the wavelength converter, thus formed, in the direction normal to the major surfaces of the glass plates. An output power of the laser device was 100 mW and a beam radius of the laser beam was 10 μm. The diagonal element $d_{11} = 160$ pm/V was used for converting the wavelength. The second harmonic of the wavelength 0.650 μm was generated. The power of the second harmonic was 14 μW.

EXAMPLE 2

100 glass plates each of 4.4 μm, which exhibit 1.78 of the refractive index for light of wavelength 0.884 μm and 1.83 for light of wavelength of 0.442 μm, and spacers of 4.4 μm were alternately layered. Melted 3,5-dimethyl-1-(4-nitrophenyl) pyrazole was sucked into the gap between the adjacent glass plates, and monocrystalline of the material was grown in the gap by the Bridgman method, to form a wavelength converter constructed as shown in FIG. 1.

A laser beam of wavelength 0.884 μm emitted from a semiconductor laser device was incident on the wavelength converter, thus formed, in the direction normal to the major surfaces of the glass plates. An output power of the laser device was 100 mW and a beam radius of the laser beam was 10 μm. The diagonal element $d_{32} = 90$ pm/V was used for converting the wavelength. The second harmonic of the wavelength 0.442 μm was generated. The power of the second harmonic was 100 μW.

As seen from the foregoing description, the wavelength converter of the invention sets up the phase matching by using the diagonal element of the second degree, nonlinear optical tensor, and generates the second harmonic. Even in a case where the nondiagonal element $d_{ij}(i \neq j)$ of the second degree, nonlinear optical tensor is used, there is no need to cut the crystal for realizing the phase matching, and therefore the nondiagonal element $d_{ij}$ can be effectively used. Therefore, the invention has successfully realized a bulky wavelength converter having a remarkably higher wavelength converting efficiency than the conventional bulk type wavelength converter. Additionally, in the present invention, there is no difficulty in manufacturing the wavelength converter, unlike the domain inverting type wavelength converter, where thin films are layered alternately inverting the directions of the nonlinear optical coefficients thereof.

What is claimed is:

1. A wavelength converting apparatus for converting a fundamental light wave to its second harmonic, the apparatus being a bulk-crystal type multilayered structure having a plurality of surfaces such that said fundamental light wave, incident upon a first surface of said plurality of surfaces in a direction normal thereto, passes through said multilayered structure and exits from a second surface of said plurality of surfaces opposite to said first surface as a second harmonic of said fundamental light wave, the apparatus comprising:

a plurality of nonlinear medium layers, each of said nonlinear medium layers having a thickness, measured along the direction of propagation of said fundamental light wave, equal to an odd-number multiplied by one coherence length, said coherence length being a one half period of an intensity variation of said second harmonic, said nonlinear medium layers containing material having a nonlinear optical characteristic of the second degree; and a plurality of linear medium layers, alternately layered with said nonlinear medium layers, each of said linear medium layers having a thickness, measured along the direction of propagation of said fundamental light wave, equal to an odd-number multiplied by said one coherence length, said linear medium layers not containing material causing a nonlinear optical characteristic of the second degree.

2. The wavelength converting apparatus according to claim 1, wherein said nonlinear and said linear medium layers have refractive indexes which are equal to each other.

3. The wavelength converting apparatus according to claim 1, wherein each of said nonlinear medium layers includes a second degree nonlinear optical coefficient and each of said second degree nonlinear optical coefficients have a polar alignment oriented in the same direction.

4. The wavelength converting apparatus according to claim 1, wherein each of said nonlinear medium layers have a thickness of 1.3 $\mu$m and contain 2-methyl-4-nitroaniline, each of said linear medium layers have a thickness of 1.3 $\mu$m and contain glass, and said incident fundamental light wave is a laser beam of wavelength 1.30 $\mu$m, an output power of 100 mW and a beam radius of 10 $\mu$m.

5. A wavelength converting apparatus according to claim 1 wherein each of said nonlinear medium layers have a thickness of 4.4 $\mu$m and contain 3,5-dimethyl-1-(4-nitrophenyl) pyrazole, each of said linear medium layers have a thickness of 4.4 $\mu$m and contain glass, and said incident fundamental light wave is a laser beam of wavelength 0.884 $\mu$m, an output power of 100 mW and a beam radius of 10 $\mu$m.

* * * * *